No. 769,402.  
PATENTED SEPT. 6, 1904.  
E. J. PENNINGTON.  
VEHICLE.  
APPLICATION FILED JAN. 18, 1904.  
NO MODEL.

Witnesses  
Inventor  
Edward J. Pennington,  
by  
Attorneys.

No. 769,402.

Patented September 6, 1904.

UNITED STATES PATENT OFFICE.

EDWARD J. PENNINGTON, OF CLEVELAND, OHIO, ASSIGNOR TO WILLIAM J. MORGAN AND ARTHUR F. MAY, OF CLEVELAND, OHIO.

VEHICLE.

SPECIFICATION forming part of Letters Patent No. 769,402, dated September 6, 1904.

Application filed January 18, 1904. Serial No. 189,535. (No model.)

*To all whom it may concern:*

Be it known that I, EDWARD J. PENNINGTON, of Cleveland, in the county of Cuyahoga and State of Ohio, have invented certain new and useful Improvements in Vehicles, of which the following is a specification, reference being had to the accompanying drawings and to the numerals of reference marked thereon.

My invention relates more particularly to automobiles; and it consists in means for connecting the body of the vehicle to the running-gear whereby simplicity, strength, and ease of travel over rough roads are obtained and swaying or side-rocking of the body, whether due to travel, turning curves, or to the weight of persons mounting or alighting from the vehicle, prevented.

Figure 1:
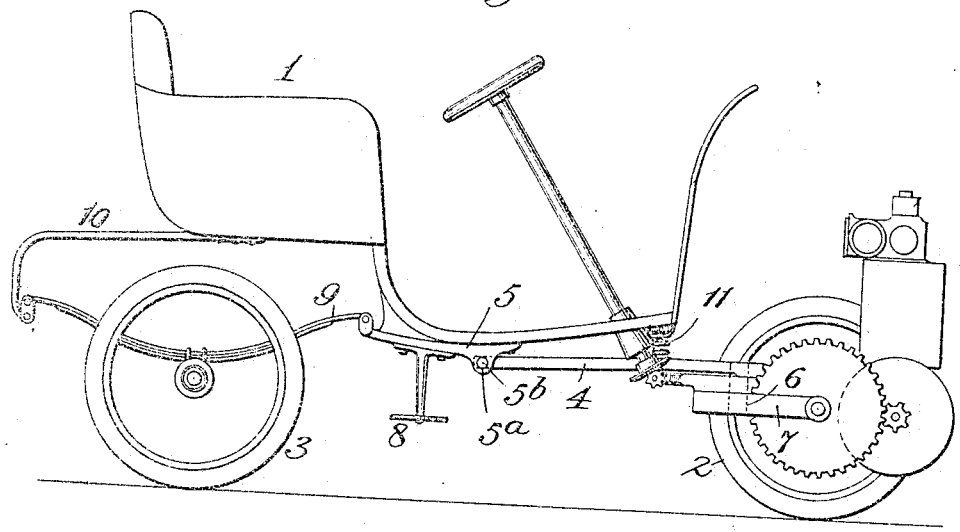
Figure 2:
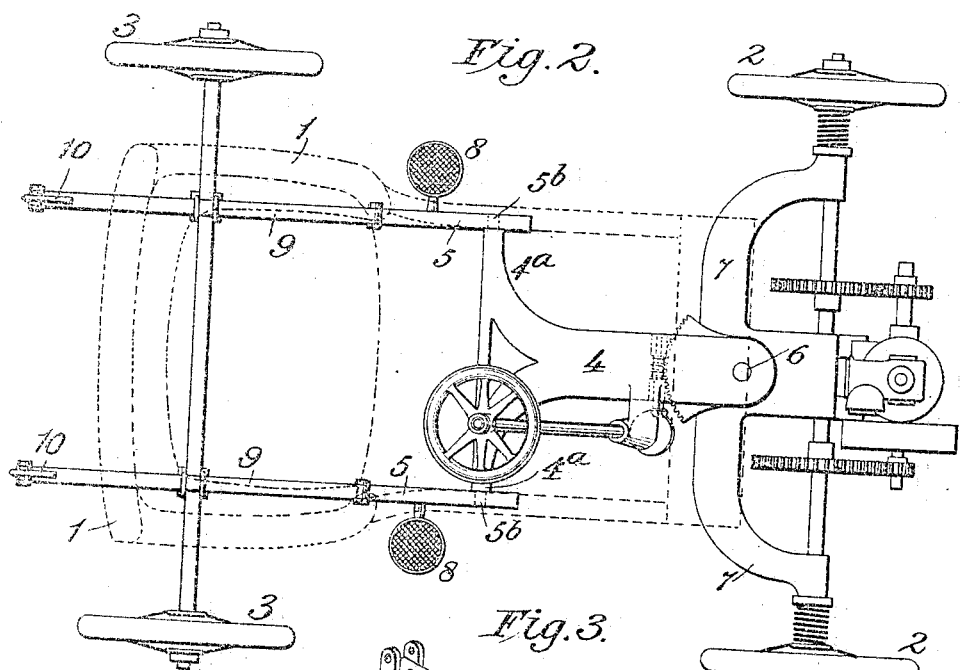
Figure 3:

In the accompanying drawings, Figure 1 is a side view of an automobile containing my invention. Fig. 2 is a plan. Fig. 3 is a detached detail.

Similar numerals of reference indicate similar parts in the respective figures.

1 is the body of the vehicle, of which 2 2 and 3 3 are respectively the front and rear wheels.

As described in my applications, Serial Nos. 189,534, 189,536, and 189,537, filed herewith, the motive mechanism is carried by a frame supported by the front axle, there being pivoted to said frame a reach extending rearwardly to the body, to which it is preferably trunnioned, a spring being, though not necessarily, interposed between the reach and the body, while coöperating steering devices are carried in part by said frame and in part by the reach.

In my present invention I provide for trunnioning the reach 4 at either side of and under the body 1 in a support 5, bolted or suitably secured thereto and shown detached in Fig. 3. Each support 5 has a socket $5^a$, into which a trunnion $5^b$ of the reach fits. The arms $4^a$ of the reach extend practically across the body 1, and their trunnions entering the sockets $5^a$ and the forward end of the reach being rigidly, except as to pivotal movement at the king-bolt 6, connected to the frame 7, mounted upon the front axle, it is obvious that the body is braced against swaying or side-rocking. The pillar of a step 8 is secured to each of the supports 5, and by reason of the rigid bracing described the weight of a person entering or alighting from the vehicle will not cause tipping of the body. The supports 5 also serve for the attachment of the inner ends of the rear leaf-springs 9, the outer ends of which are secured to backwardly-extending arms 10. A cushioning device 11 is interposed between the reach 4 and the body 1 and preferably used, although it may be omitted.

The arrangement of the steering devices is in my preferred construction as set forth in my said applications Serial Nos. 189,534, 189,536, and 189,537.

I do not restrict myself to the exact details of construction and combination, herein described and shown, as they may be varied by the skilful mechanic without departing from the spirit of my invention, and such changes as may suggest themselves to others not involving invention I consider within the terms of my claims.

Having described my invention, I claim—

1. In a wheeled vehicle, the combination of a body, a front axle, a support at either side of and under the body provided with sockets, a reach having trunnioned arms adapted to enter said sockets, and a frame mounted upon the front axle and pivoted to the forward end of the reach, substantially as set forth.

2. In a wheeled vehicle, the combination of a body, a front axle, a support at either side of and under the body provided with sockets, a reach having trunnioned arms adapted to enter said sockets, a frame mounted on the front axle and pivoted to the forward end of the reach, and a cushioning-body interposed between the body of the vehicle and the reach, substantially as set forth.

3. In a wheeled vehicle, the combination of a body, a front axle, a support at either side of and under the body provided with sockets, a reach having trunnioned arms adapted to enter said sockets, a frame mounted on the front axle and pivoted to the forward end of the reach, rear springs having their forward ends attached to the said supports, and backwardly-projecting arms, to which the outer ends of said springs are secured, substantially as set forth.

4. In a wheeled vehicle, the combination of a body, a front axle, a support at either side of and under the body, a reach having transverse arms adapted for attachment to said supports, and a frame mounted upon the front axle and pivoted to the forward end of the reach, substantially as set forth.

In testimony whereof I hereunto set my hand and seal.

EDWARD J. PENNINGTON. [L. S.]

Witnesses:
G. H. HOWARD,
S. T. BROOKS.